Jan. 21, 1969  J. A. SANDERS  3,422,725

AUTOMATIC SPIRAL INDEX MECHANISM

Filed April 22, 1966  Sheet _1_ of 3

INVENTOR.
JOSEPH A. SANDERS
BY Whittemore,
Hulbert & Belknap
ATTORNEYS

INVENTOR.
JOSEPH A. SANDERS
BY
ATTORNEYS

United States Patent Office 3,422,725
Patented Jan. 21, 1969

3,422,725
AUTOMATIC SPIRAL INDEX MECHANISM
Joseph A. Sanders, Detroit, Mich., assignor to Allegheny
   Ludlum Steel Corporation, Pittsburgh, Pa., a corporation of Pennsylvania
Filed Apr. 22, 1966, Ser. No. 544,565
U.S. Cl. 90—11.62                                   16 Claims
Int. Cl. B23c *17/00;* B23c *3/28;* B23b *29/24*

ABSTRACT OF THE DISCLOSURE

Automatic spiral indexing mechanism including a drive connected between table traverse mechanism and means for rotating the work spindle, together with means for disconnecting the work spindle drive mechanism and reengaging it in index position.

---

The present invention relates to automatic spiral index mechanism.

Machine tools are available in which a slide is provided for rectilinear reciprocation, the slide carrying a rotary work support whose axis of rotation is parallel to the direction of reciprocation of the slide. Means are provided for driving the work support in rotation in timed relation to its longitudinal advance so that a work piece is reciprocated and rotated on its axis simultaneously in timed relation so as to develop a desired lead or helix angle.

Machine tools of this type may be metal cutting machines, such for example as milling machines, grinding machines, or other types of machines intended and adapted to perform work on helically disposed parts of the workpiece. Work pieces of the character described may for example be milling cutters, drills, helical gears, or the like.

It is an object of the present invention to provide automatically operable means for effecting incremental index rotation of the work support at an appropriate part of the reciprocating stroke so that a work piece may be advanced in a helical path relative to a tool, withdrawn in the same helical path, or by conventional rise and fall mechanism moved radially into clearance, and while in clearance with respect to the tool, given a predetermined index rotation to bring a circumferentially spaced portion of the work piece into position to engage the tool on the next forward stroke.

It is a further object of the present invention to provide self-contained fully automatic index mechanism associated with means for effecting timed rotation of the work piece in accordance with its rectilinear movement.

More specifically, it is a feature of the present invention to proivde a rotary head normally rotatable with a gear in a train of gearing effective to rotate a work spindle in accordance with traverse of the spindle, said head being rotatable relative to the gear for effecting index rotation of the work spindle, motor means connected between said head and said gear, and releasable locator means for selectively coupling said gear to said head.

More specifically, it is a feature of the present invention to provide a slide supporting a work spindle, means for traversing the slide including gearing, means for rotating the work spindle including gearing interconnecting the traverse gearing and spindle, comprising a first gear, a rotatable casing, independently rotatable structure within said casing, releasable locator means selectively connecting said structure and casing, motor means within said casing connected between said structure and casing and operable to effect relative rotation therebetween, and a drive gear coaxial with said first gear rotatable relative thereto upon relative rotation between said casing and structure and effective to produce index rotation of said work spindle superimposed upon the timed rotated thereof resulting from rotation of said first gear.

It is a further feature of the present invention to provide structure as described in the preceding paragraph in which the gearing interconnecting said structure and casing comprises a ring gear affixed to said casing, planetary gears in mesh with said ring gear and carried by said structure, and a sun gear in mesh with said planetary gears and affixed to said drive gear.

It is a further feature of the present invention to provide automatic spiral index mechanism comprising a carriage reciprocable on a frame, a rotary work support spindle carried by said carriage, traverse mechanism for reciprocating said carriage including a rotary gear, means for rotating said spindle in timed relation to traverse of said carriage comprising a rotary gear operatively connected to said spindle, bearing interconnecting said rotary gears including a train of gears terminating in a first gear having an opening therethrough, a second gear extending through the opening in said first gear and adapted to mesh with the rotary gear connected to said spindle, and index means for alternately locking said second gear to said first gear for rotation therewith and for effecting predetermined index rotation of said second gear relative to said first gear.

It is a further feature of the present invention to provide automatic spiral index mechanism as described in the preceding paragraph in which said index means comprises a carrier fixedly connected to said first gearing, a casing in which said carrier is rotatable, an internal gear in said casing, a plurality of planetary gears rotatably carried by said carrier and in mesh with said internal gear, and a sun gear fixed to said second gear, and selectively releasable means rigidly interconnecting said carrier and casing operable when engaged to prevent relative rotation between said first and second gears.

It is a further feature of the present invention to provide mechanism as described in the previous paragraph comprising a motor connected between said carrier and said casing including means in driving relation to said second gear and operable when said releasable means are released to effect index rotation of said second gear relative to said first gear.

Other objects and features of the invention will become apparent as the description proceeds, especially when taken in conjunction with the accompanying drawings, illustrating a preferred embodiment of the invention, wherein.

Figure 1:
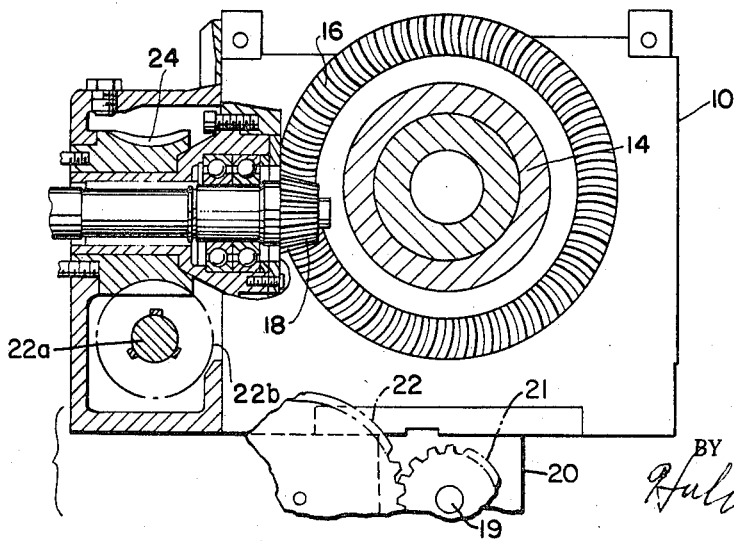
FIGURE 1 is an elevational view, partly in section, of a work carriage.

Referring first to FIGURE 1, a work carriage 10 is provided which is mounted on the frame of a machine tool and is adapted to be reciprocated in forward and reverse strokes thereon by suitable mechanism. Conveniently, the traverse strokes of the work carriage may be accomplished by a conventional feed screw and nut in which either the feed screw or the nut is rotated from a power source, such for example as an electric motor, through suitable gearing comprising a gear train interconnected between the motor and either the feed nut or the feed screw.

Figure 2:
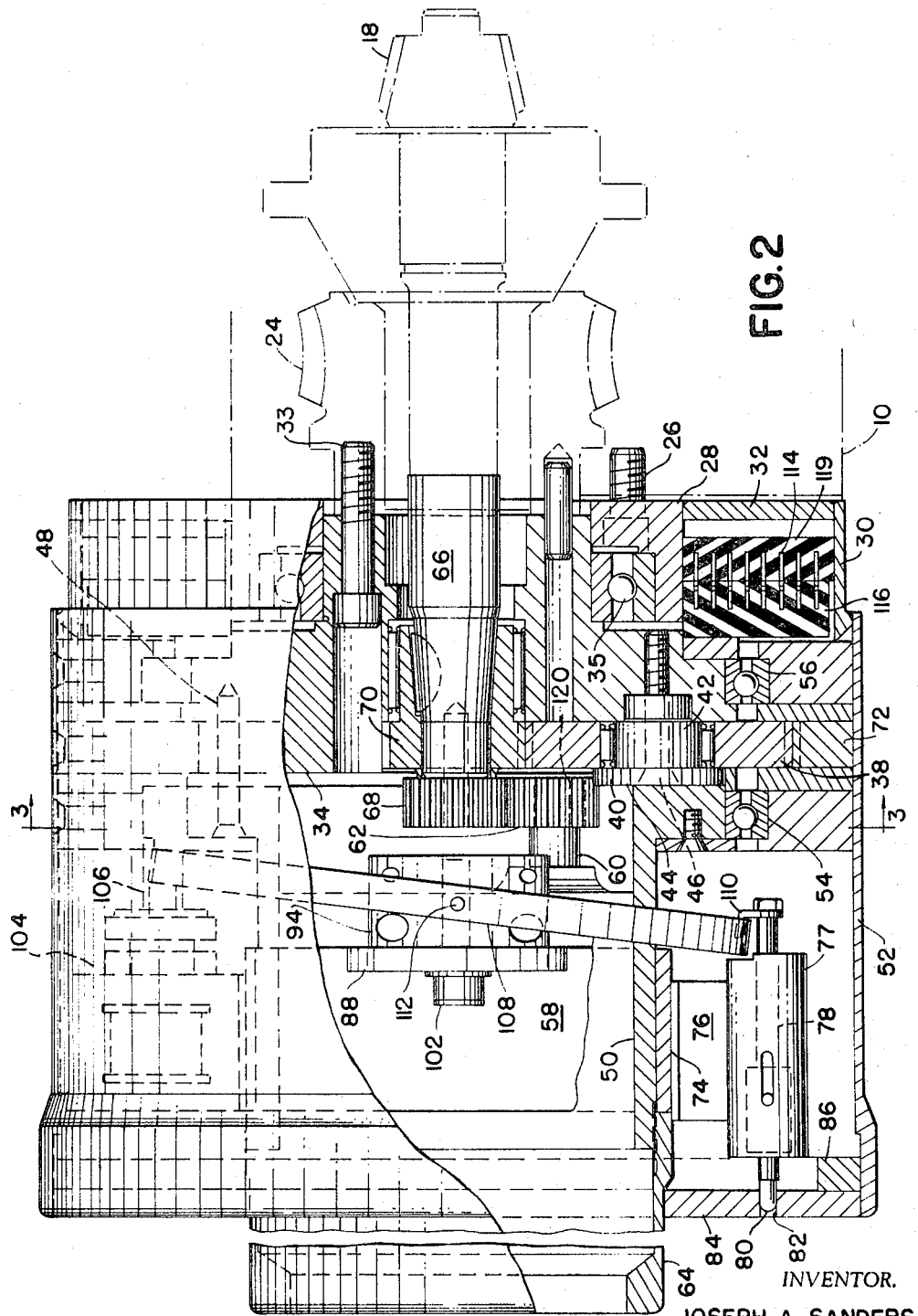
FIGURE 2 is an enlarged elevational view of automatic spiral index mechanism associated with said work carriage, with parts broken away and sectioned on the broken line 2—2, FIGURE 3.

The work carriage includes a rotatable work spindle 14. Connected to the spindle to drive it in rotation is a ring gear 16 adapted to be driven by a bevel gear 18 in mesh therewith. Means subsequently to be described are provided for effecting rotation of the bevel gear 18 in timed relation to traverse of the carriage 10. In this figure a feed screw 19 is provided which extends parallel to the work spindle and is received in a stationary nut 20 affixed to the work carriage 10. A gear 21 is connected to the screw shaft 19 and meshes with a gear 22 which is one of a plurality of change gears connecting to a shaft 22a carrying a worm 22b which meshes with a worm gear 24. The worm gear 24 is connected, as best seen in FIGURE 2, to the work spindle drive and indexing mechanism which will subsequently be described. Under operating conditions, means are provided which mechanically couple the worm gear 24 to the bevel gear 18 so that the bevel gear 18 is driven in predetermined timed relation with respect to traverse of the carriage 10. As a result of this, the work spindle 14 is advanced longitudinally in the direction of its axis and is at the same time rotated in accurately timed relation to its rate of axial advance so that portions of a work piece carried by the work spindle move in a helical path.

The work carriage as described herein may be applied to different types of machine tools for different operations on the work piece. For example, a work piece such for example as a milling cutter, a drill, or even a helical gear may be machined during its helical advance by a metal cutting tool, grinding wheel, or the like.

In performing repeated operations on circumferentially spaced helical portions of a work piece, it is essential between each forward and reverse stroke of the work piece to effect an accurately controlled index rotation of the work piece so that a tool operating in a fixed position may machine a plurality of different portions of the work piece such for example as a plurality of helically extending flutes on a cutting tool or a plurality of tooth spaces in a helical gear.

The mechanism for selectively coupling the bevel gear 18 to the worm gear 24 is best seen in FIGURE 2. A portion of the work carriage 10 is shown as connected by screws 26 to a welded assembly including an annular bearing retainer 28, an outer ring 30 and a flat annular member 32 welded between the retainer 28 and the outer ring 30.

Figure 3:
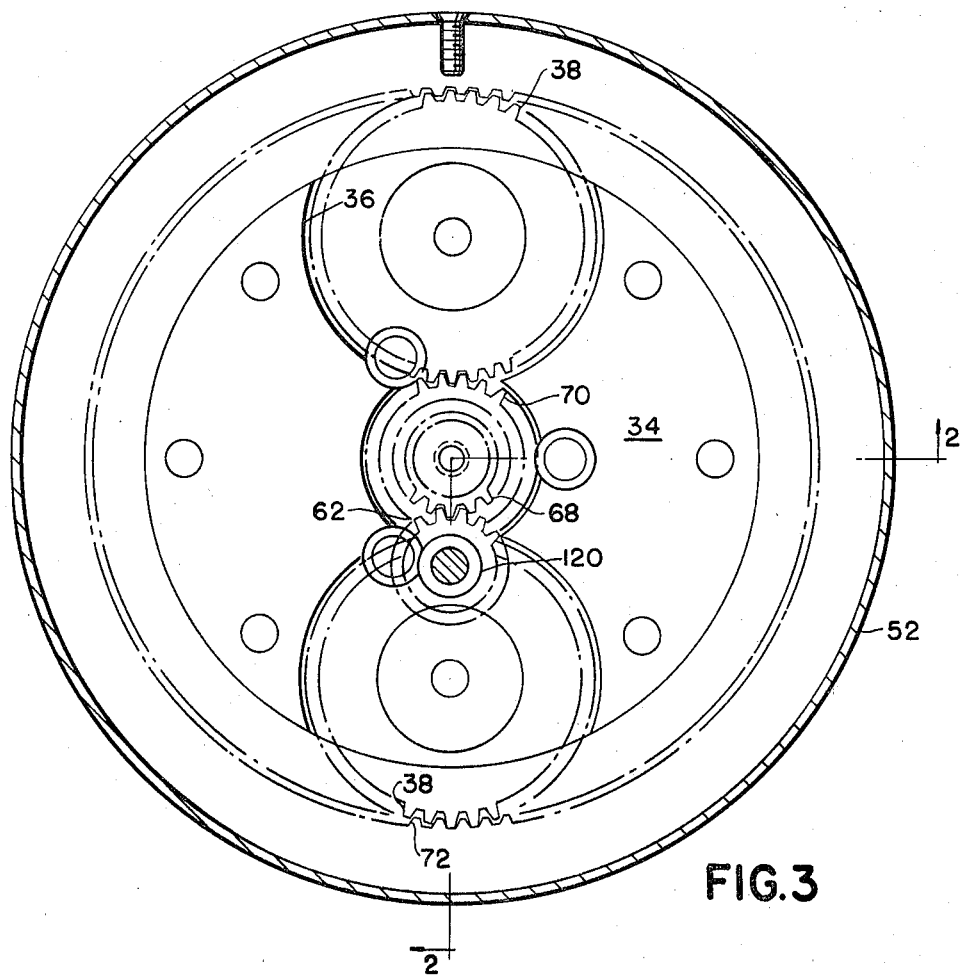
FIGURE 3 is a fragmentary sectional view on the line 3—3, FIGURE 2.

Rigidly connected to the worm gear 24 by screws 33 is a carrier 34 which is mounted for rotation by bearings 35 in the welded assembly which includes the annular bearing retainer 28. The carrier 34, as best seen in FIGURE 3, is provided with a pair of diametrically opposed partly cylindrical pockets 36 in each of which is received a planet gear 38 mounted for rotation on bearings 40 interposed between a bushing 42 and a central opening in the gear 38. The gear 38 is retained in place by a circular plate 44 fastened to the carrier 34 by screws 46.

The carrier 34 has connected to it as by screws 48, a motor support and housing member 50. The carrier 34 and the member 50 are rotatable as a unit with the worm gear 24 and are surrounded by a rotatable casing 52. The rotatable relationship between the casing 52 and the assembly comprising the carrier 34 and support member 50 is provided by a pair of bearings 54 and 56.

Located within a cylindrical portion of the member 50 is an electric motor 58 having an output shaft 60 carrying a drive pinion 62. A tubular housing member 64 is connected to the member 50 and extends rearwardly therefrom and covers and supports the rear portion of the motor 58.

Bevel gear 18 is carried by an elongated shaft 66 which at its rear end is provided with a cluster gear keyed to the shaft 66 comprising a pinion 68 in mesh with the pinion 62 mounted on the output shaft 60 of the motor 58, and a sun gear 70 which as best seen in FIGURE 3, is in simultaneous mesh with the planet gears 38. The shaft 66 extends through a longitudinal opening in the worm gear 24 so that the bevel gear 18 may be rotated with the worm gear 24 under certain conditions and may have independent rotation relative thereto under certain other conditions as will subsequently be described.

Fixedly secured to the inner surface of the casing 52 is an internal gear 72 which is in mesh with the diametrically opposed planet gears 38 as clearly seen in FIGURE 3.

Figure 4:
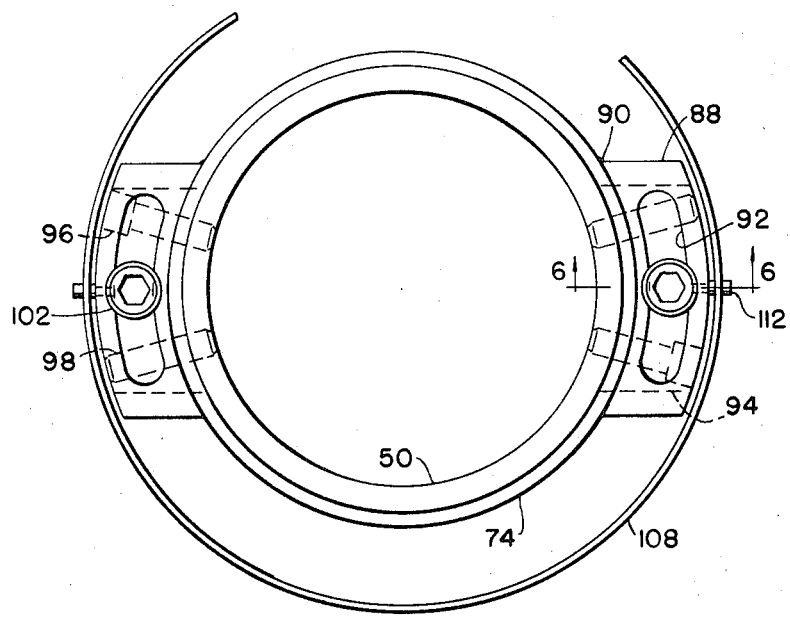
FIGURE 4 is an elevational view of an adjustable sleeve employed in the construction.
Figure 5:
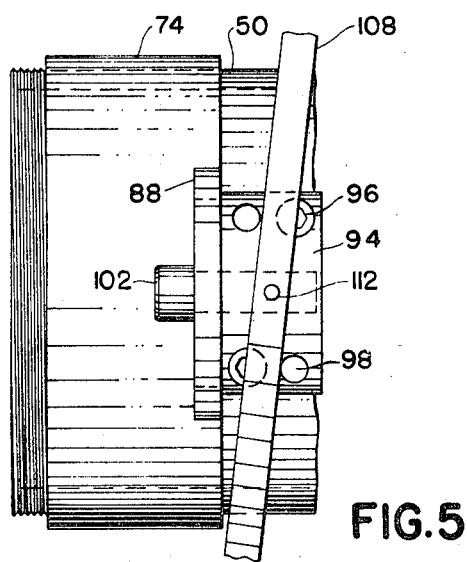
FIGURE 5 is a side elevation of the sleeve shown in FIGURE 4.
Figure 6:
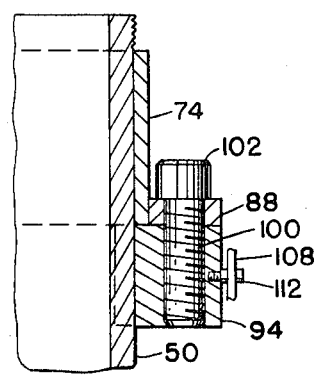
FIGURE 6 is a fragmentary bottom plan view of the sleeve of FIGURE 4.

Surrounding an intermediate portion of the member 50 forwardly of the tubular housing member 64 is a cylindrical sleeve 74 to a side of which is secured a bracket 76 supporting a plunger housing 77 having therein a spring pressed plunger 78 having a nose piece 80 adapted to be received in one of a plurality of circumferentially arranged index openings 82 provided in an annular index ring 84 affixed to the casing 52 as for example by welding to an intermediate ring 86. The sleeve 74, as best seen in FIGURES 4–6, is provided at diametrically opposite sides with radially extending flat ears 88 welded thereto as indicated at 90, the ears being provided with elongated arcuate openings 92 for a purpose which will subsequently be described. Affixed to the exterior surface of the member 50 are a pair of arcuate blocks 94, each of the blocks being affixed to the member 50 by a pair of assembly screws 96 and a pair of locating dowel pins 98. The blocks 94 are provided with tapped openings 100 for the reception of clamping screws 102 which when tightened down as shown in FIGURE 6, prevent rotation of the sleeve 74 on the member 50. Conversely, when the screws 102 are loosened, the sleeve 74 may be slightly rotated and will thus provide for fine adjustment of the bracket 76 and plunger 78 relative to the casing including the index ring or plate 84 and hence, a fine adjustment between bevel gear 18 and worm gear 24.

Carried by the sleeve 74 at the outer surface thereof and diametrically opposite to the bracket 76 is a solenoid 104 having a plunger 106 connected to a hoop or ring 108, the lower portion of which is engaged with a hook 110 carried at the outer end of the plunger 78. The hoop or ring 108 is pivoted on pins 112 carried by the blocks 94.

Means are provided for bringing power to the electric motor 58 and to the windings of the solenoid 104 for effecting indexing at a suitable stage in the operation of the machine. This means includes brushes indicated more or less diagrammatically at 114, comprising conducting rings carried by formica members 116 and 119.

Preferably, means are provided to absorb shock as the pin 80 enters an index opening 82 and thus provides abrupt termination of relative movement between the parts. Conveniently, this may take the form of a yieldable torque transmitting means 120 interposed between motor shaft 60 and pinion gear 62.

With the structure as described in the foregoing it will be observed that when the nose piece 80 of the plunger 78 is received in a selected one of the openings 82 provided in the index ring or plate 84, relative rotation between the casing 52 on the one hand and the assembly comprising the worm gear 24, the carrier 34, the motor housing and support member 50, and the motor 58 carried thereby, on the other hand, is effectively prevented. For simplicity, assume that the worm 22 is stationary, holding the worm gear 24 stationary, then if the nose piece 80 is withdrawn from the opening 82 in the index plate or ring, and if power is supplied to the motor 58 tending to drive its output pinion 62 in rotation, the resulting actions and reactions can best be understood by reference to FIGURE 3. In this figure, since the worm gear 24 and the carrier 34 are assumed stationary, and since the casing 52 and internal gear 72 are now freely rotatable by reason of release of the locking mechanism 80, 82, operation of the motor 58 carried by the carrier 34, is permitted. Rotation of the pinion 62 rotates pinion 68, sun gear 70, shaft 66, and bevel gear 18. Rotation of sun gear 70 effects rotation of planet gears 38 on their axes although the carrier 34 does not of course rotate. However, rotation of the planet gears 38 effects rotation of the casing 52. Since this operation results in rotation of the bevel gear 18 relative to the worm gear 24, it in turn results in rotation of the work spindle 14 in an index rotation. While the foregoing was assumed for simplicity to take place while the worm gear 24 was stationary, it will of course be readily apparent that the operation is exactly the same even though it takes place during continued rotation of the worm gear 24 in timed relation to traverse of the work support 10. Thus, at an appropriate point in the automatic cycling of the machine, solenoid 104 is energized to retract plunger 78 and at the same time motor 58 is energized, effecting differential rotation between the worm gear 24 and the bevel gear 18. As soon as relative rotation between the plunger housing 77 and the index plate or ring 84 commences, the solenoid 104 is de-energized and spring means in the plunger housing 77 biases the plunger toward the index plate or ring so that when the nose piece 80 arrives at the next opening 82, it drops into place, thus completing the index rotation of the work spindle. Switch means for controlling the motor 58 and solenoid 104 may be of conventional type and the index operation initiated at a time when the work support slide is substantially in retracted position.

The drawings and the foregoing specification constitute a description of the improved automatic spiral index mechanism in such full, clear, concise and exact terms as to enable any person skilled in the art to practice the invention, the scope of which is indicated by the appended claims.

What I claim as my invention is:

1. Automatic spiral index mechanism comprising a work carriage, means including carriage reciprocating gearing for reciprocating said carriage, a work spindle on said carriage, spindle drive gearing including a driven gear in mesh with a gear in the carriage reciprocating gearing for rotating said spindle in timed relation to travel of said carriage and including a shaft rotatable independently of said driven gear, an index motor connected in driving relation between said driven gear and said shaft, an apertured index plate and pin connected in rigid coupling relation between said driven gear and shaft, said pin being movable into and out of selected apertures in said plate to effect accurate relative index rotation between said driven gear and shaft, said index motor being operable while said pin is disengaged from said plate to effect relative rotation between said driven gear and shaft.

2. Mechanism as defined in claim 1 in which said driven gear is a tubular gear, said shaft extending through said tubular gear.

3. Mechanism as defined in claim 2 comprising a carrier connected to said tubular gear, a sun gear fixed to the shaft of said second gear, planet gears pivotally carried by said carrier and in mesh with said sun gear, a casing surrounding said motor and rotatable relative to said carrier, and an internal gear fixed in said casing in mesh with said planet gears.

4. Mechanism as defined in claim 3 in which said releasable lock means acts between said carrier and said casing.

5. Mechanism as defined in claim 3 in which said motor is mounted on said carrier, a sleeve on said carrier surrounding said motor, a ring adjustable on said sleeve, a plunger device carried by said sleeve, comprising a plunger, said casing having a series of openings into which said plunger is movable to lock said sleeve and carrier against rotation relative to said casing and hence to prevent relative rotation between said tubular gear and said second gear.

6. Mechanism as defined in claim 5, a solenoid carried by said sleeve at the side thereof opposite said plunger device, a plunger release ring surrounding said sleeve and pivoted thereto, means connecting said plunger release ring to said solenoid and to said plunger.

7. Automatic spiral index mechanism comprising spindle drive gearing including a first gear having an axially extending opening therethrough, a second gear coaxial with said first gear and having a shaft portion extending through the opening in said first gear, motor means carried by and rotatable with one of said gears, drive connections between said motor means and said other gear, and releasable lock means comprising rotatable cooperating locking parts, means providing for relative rotation between said parts whenever relative rotation occurs between said gears.

8. Mechanism as defined in claim 7 in which the drive connections between said motor and said other gear comprises gears.

9. Mechanism as defined in claim 7 comprising a rotatable index plate element having index openings therein, a movable lock pin element receivable in said openings to prevent relative rotation between said first and second gears.

10. Mechanism as defined in claim 7 comprising a rotary support for one of said elements, the other of said elements being connected directly to one of said first and second gears for rotation therewith, and gearing connecting said rotary support to the other of said first and second gears.

11. Automatic spiral index mechanism comprising spindle drive gearing including a first gear having an axially extending opening therethrough, a second gear coaxial with said first gear and having a shaft portion extending through the opening in said first gear, a carrier connected to and rotatable with one of said gears, a motor on said carrier, gearing connecting said motor to the other of said gears, a rotary index member having index openings therein rotatable with one of said gears, a locating plunger rotatable with the other of said gears, and means for energizing said motor while said plunger is retracted from said member to effect relative rotation between said gears.

12. Mechanism as defined in claim 11 comprising a casing surrounding said carrier and rotatable thereon about the axes of said gears, an internal gear fixed in said casing, planet gears on said carrier in mesh with said internal gear, a sun gear in mesh with said planet gears and fixed to and rotatable with said other gear.

13. Mechanism as defined in claim 12 in which said index member is fixed to and rotatable with said casing, and said plunger is mounted on said carrier.

14. Automatic spiral index mechanism comprising a work carriage, traverse gearing for reciprocating said carriage, a work support spindle mounted on said carriage for rotation about an axis parallel to the direction of reciprocation of said carriage, means for rotating said spindle including spindle drive gearing interconnecting said traverse gearing and spindle, said spindle drive gearing comprising a pair of coaxial relatively rotatable gears the first of which is driven by gearing connected to said traverse gearing and the second of which is connected to said spindle, a first member directly connected to one of said gears for rotation therewith, a casting member mounted on said first member for rotation about an axis coincident with the axis of said coaxial gears, motor means connected between one of said members and said other gear, gearing connected between the other one of said members and said casing member, and releasable lock means operably connected between said members.

15. Automatic spiral index mechanism comprising a work carriage, traverse gearing for reciprocating said carriage, a work support spindle mounted on said carriage for rotation about an axis parallel to the direction of reciprocation of said carriage, means for rotating said spindle including spindle drive gearing interconnecting said traverse gearing and spindle, said spindle drive gearing comprising a pair of coaxial relatively rotatable gears the first of which is driven by gearing connected to said traverse gearing and the second of which is connected to said spindle, a support connected directly to the first of said gears, a casing rotatable on said support about an axis coincident with the axes of said gears, a motor carried by said support, gearing connecting said motor to the second of said gears, gearing connecting said second gear to said casing, and releasable lock means connected between said support and said casing.

16. Mechanism as defined in claim 15 comprising yieldable torque transmission means provided in the drive transmission extending from said motor.

References Cited

UNITED STATES PATENTS

| | | | |
|---|---|---|---|
| 2,094,484 | 9/1937 | Bennett | 90—11.62 |
| 2,228,583 | 1/1941 | Parsons | 74—825 |
| 3,295,416 | 1/1967 | Apthorp et al. | 90—11.42 |

FRED C. MATTERN, JR., *Primary Examiner.*

F. D. SHOEMAKER, *Assistant Examiner.*

U.S. Cl. X.R.

74—817; 90—21